(12) United States Patent
Fukasawa et al.

(10) Patent No.: US 10,815,587 B2
(45) Date of Patent: Oct. 27, 2020

(54) SHEET OF MICROFIBER ASSEMBLY

(75) Inventors: Yasuhiko Fukasawa, Tokyo (JP);
Kazushi Kimura, Tokyo (JP)

(73) Assignee: KOKEN, LTD., Tokyo (JP)

( * ) Notice: Subject to any disclaimer, the term of this patent is extended or adjusted under 35 U.S.C. 154(b) by 771 days.

(21) Appl. No.: 13/061,580

(22) PCT Filed: Nov. 12, 2009

(86) PCT No.: PCT/JP2009/006057
§ 371 (c)(1),
(2), (4) Date: Mar. 1, 2011

(87) PCT Pub. No.: WO2010/055668
PCT Pub. Date: May 20, 2010

(65) Prior Publication Data
US 2011/0159765 A1  Jun. 30, 2011

(30) Foreign Application Priority Data
Nov. 14, 2008 (JP) .................... 2008-292747

(51) Int. Cl.
*D04H 3/16* (2006.01)
*D01F 6/50* (2006.01)
(Continued)

(52) U.S. Cl.
CPC .......... *D01D 5/0038* (2013.01); *D01F 6/50* (2013.01); *D04H 1/4309* (2013.01); *D04H 1/4318* (2013.01); *D04H 1/4382* (2013.01); *D04H 1/56* (2013.01); *D04H 3/16* (2013.01); *B01D 2239/0622* (2013.01); *B01D 2239/0631* (2013.01); *B01D 2239/0654* (2013.01); *B01D 2239/10* (2013.01); *B01D 2239/1233* (2013.01);
(Continued)

(58) Field of Classification Search
USPC .......................................... 442/346
See application file for complete search history.

(56) References Cited

U.S. PATENT DOCUMENTS 5,866,285 A * 2/1999 Anderson et al. .......... 430/41
6,066,396 A * 5/2000 Inada ..................... D01F 1/07
264/172.13

(Continued)

FOREIGN PATENT DOCUMENTS

| JP | 63-145465 | 6/1988 |
|----|-----------|--------|
| JP | 11-107047 | 4/1999 |

(Continued)

OTHER PUBLICATIONS

The-Crankshaft Publishing, Polyvinyl Resins, http://what-when-how.com/materialsparts-and-finishes/polyvinyl-resins/.*
(Continued)

*Primary Examiner* — Marla D McConnell
*Assistant Examiner* — Kevin Worrell
(74) *Attorney, Agent, or Firm* — Hauptman Ham, LLP

(57) ABSTRACT

The present invention aims to provide a sheet of microfiber assembly having a high filtering performance suitable as an oil-mist filter. A sheet of microfiber assembly 2 comprises microfibers 1 each having a fiber diameter of 3,000 nm or less and is formed of a mixture of water-insoluble but alcohol-soluble acetalized polyvinyl alcohol resin and water-insoluble but alcohol-soluble fluorine resin.

4 Claims, 5 Drawing Sheets

(51) Int. Cl.
*D04H 1/4318* (2012.01)
*D04H 1/4309* (2012.01)
*D04H 1/56* (2006.01)
*D01D 5/00* (2006.01)
*D04H 1/4382* (2012.01)

(52) U.S. Cl.
CPC ...... *Y10T 442/3707* (2015.04); *Y10T 442/626* (2015.04)

(56) References Cited

U.S. PATENT DOCUMENTS

| | | | |
|---|---|---|---|
| 7,374,416 B2* | 5/2008 | Cook et al. | 425/382.3 |
| 7,445,125 B2 | 11/2008 | Ellsworth et al. | |
| 2005/0233021 A1* | 10/2005 | Chun et al. | 425/174.8 E |
| 2007/0196401 A1 | 8/2007 | Naruse et al. | |
| 2007/0244266 A1* | 10/2007 | Lumpp | 525/385 |
| 2008/0187996 A1* | 8/2008 | Baca et al. | 435/396 |
| 2009/0032475 A1* | 2/2009 | Ferrer et al. | 210/799 |
| 2011/0130063 A1* | 6/2011 | Matsubayashi | D01D 4/025 442/400 |

FOREIGN PATENT DOCUMENTS

| | | | |
|---|---|---|---|
| JP | 2000-178864 | | 6/2000 |
| JP | 2004-316022 | | 11/2004 |
| JP | 2005-264420 | | 9/2005 |
| JP | 2006-264353 | | 9/2005 |
| JP | 2005264353 A | * | 9/2005 |
| JP | 2006-144138 | | 6/2006 |
| JP | 2006-289209 | | 10/2006 |
| WO | WO 2007/024445 | * | 3/2007 |

OTHER PUBLICATIONS

ChemYQ., Polyvinl Formal, http://www.chemyq.com/En/xz/xz1/560fesld.htm.*
The-Crankshaft Publishin, Polyvinyl Resins, http://what-when-how.com/materialsparts-and-finishes/polyvinyl-resins/.*
ChemYQ., Polyvinyl Formal, http://www.chemyq.com/En/xz/xz1/560fesld.htm.*
PrintWiki—the Free Encyclopedia of Print. "Polyvinyl Fluoride." Hosted by WhatTheyThink. http://printwiki.org/Polyvinyl_Fluoride.*
Lora, Michele; Lim, Jong; McHugh, Mark. "Comparison of the Solubility of PVF and PVDF in Supercritical $CH_2F_2$ and $CO_2$ and in $CO_2$ with Acetone, Dimethyl Ether, and Ethanol." J. Phys. Chem. B 1999, 103, 2818-2822. http://pubs.acs.org/doi/pdf/10.1021/jp9844462.*
Wikipedia. "Polyvinylidene Fluoride." Downloaded Jan. 2, 2020. 8 pages. https://en.wikipedia.org/wiki/Polyvinylidene_fluoride (Year: 2020).*

* cited by examiner

SHEET OF MICROFIBER ASSEMBLY

TECHNICAL FIELD

The present invention relates to sheets of microfiber assembly each having a fiber diameter of 3,000 nm or less, and methods and apparatuses for making the same.

RELATED ART

Microfibers each having a fiber diameter of 1,000 nm or less are collectively referred to also as nanofibers and known. Sheets made of assembly of such microfibers are also known.

Characteristics of nanofibers, manufacturing processes and apparatuses for the same are described, for example, in: Yoshihiro Yamashita, "EREKUTOROSUPININGU SAIZENSEN (ELECTROSPINNING The Latest in Nanotechnology)", published from SEN-I SHA KIKAKU SHUPPAN CORPORATION (NONPATENT DOCUMENT 1).

JP 2006-289209 A (PATENT DOCUMENT 1) discloses a filter comprising a nonwoven fabric layer formed of fibers each having a fiber diameter in a range of 5000 to 20000 nm and a nanofiber nonwoven fabric layer formed of fibers each having a fiber diameter in a range of 1 to 500 nm and laminated on the former.

According to the invention described in JP 2006-144138 A (PATENT DOCUMENT 2), an aqueous solution of polyvinyl alcohol is added to a solution of an amorphous fluorine resin to obtain spinning solution, and nozzles are operatively associated with a substrate under high voltage impressed to the nozzles so that the spinning solution discharged from the nozzles may form fluorine-based nonwoven fabric on the substrate under the effect of the high voltage. Without departing from this invention, the nozzle and/or the substrate may be oscillated, if desired. The fluorine-based nonwoven fabric obtained according to this invention may be used as a filter.

JP 1988-145465 (PATENT DOCUMENT 3) discloses the invention to make so-called nanofibers having a fiber diameter of 1 μm or less by using water-soluble polyvinyl alcohol. According to this invention, each nozzle array is defined by a plurality of nozzles arranged intermittently in a width direction of an endless conveyor belt running in a machine direction and two or more of such nozzle arrays are arranged intermittently in the machine direction.

According to JP 2005-264353 A (PATENT DOCUMENT 4), spinning solution feeding means used as nozzles in an apparatus for making a nanofiber assembly are arranged in a nonlinear fashion.

PRIOR ART DOCUMENT

Patent Document

PATENT DOCUMENT 1: JP 2006-289209 A
PATENT DOCUMENT 2: JP 2006-144138 A
PATENT DOCUMENT 3: JP 63-145465 A
PATENT DOCUMENT 4: JP 2005-264353 A

Nonpatent Document

NONPATENT DOCUMENT 1: Yoshihiro Yamashita, "EREKUTOROSUPININGU SAIZENSEN (ELECTROSPINNING The Latest in Nanotechnology)" published from SEN-I SHA KIKAKU SHUPPAN CORPORATION

DISCLOSURE OF THE INVENTION

Problem to be Solved by the Invention

The component fibers constituting the nanofiber nonwoven fabric described in PATENT DOCUMENT 1 are selected from the group including polyethylene fibers, polyester fibers, polyamide fibers, polyvinyl chloride fibers, polyolefin fibers and polyacrylonitrile fibers. In view of this, the filter made of such a nonwoven fabric can not be expected to exert high filtering properties for oil-mist.

Certainly, the fluorine-based nonwoven fabric according to the invention disclosed in PATENT DOCUMENT 2 is likely an appropriate stock material to obtain the filter exerting a high filtering function for oil-mist. However, in the case of the invention disclosed in PATENT DOCUMENT 2, the sheet of fiber assembly consisting of the fluorine resin solution and the aqueous solution of polyvinyl alcohol must be immersed in hot water to remove the polyvinyl alcohol component. In addition to this problem, from description of this PATENT DOCUMENT 2, it is clear that the nozzle which may be oscillated is limited to one nozzle and it is not clear in what mode this nozzle should be oscillated, if it is desired.

Since the nanofibers obtained by the invention disclosed in PATENT DOCUMENT 3 are water-soluble, the sheet formed of such nanofibers can not be used as a filter for which sufficient water-resistance is required. In general, nanofibers discharged from a plurality of nozzles carry electric charge and, in consequence, it is difficult to distribute these nanofibers with uniformity. The invention disclosed in the PATENT DOCUMENT 3 teaches none of means to solve this problem.

According to the invention disclosed in PATENT DOCUMENT 4, a plurality of the spinning solution feeding means serving as nozzles are position-fixed and, when it is intended to make the fiber assembly having a relatively large width dimension, the number of the spinning solution feeding means must be correspondingly increased. As inevitable result, operation and maintenance of the manufacturing apparatus are complicated.

An object of the present invention is to provide a sheet of microfiber assembly wherein each microfiber having a fiber diameter of 1,000 nm or less adapted to be used as a filter exerting high filtering properties for oil-mist, and a method and an apparatus for making the same.

Measure to Solve the Problem

The problems as have been described above are solved by the present invention including a first aspect relating to the sheet of microfiber assembly, a second aspect relating to a method for making this sheet and a third aspect relating to an apparatus for making this sheet.

The first aspect of the invention targets a sheet of microfiber assembly wherein each microfiber having a fiber diameter of 3,000 nm or less.

With respect to such a sheet of microfiber assembly, the first aspect of the invention comprises the microfiber being a mixture of water-insoluble but alcohol-soluble acetalized polyvinyl alcohol resin and water-insoluble but alcohol-soluble fluorine resin.

According to one preferred embodiment of the first aspect of the invention, the microfibers are obtained by electrospinning alcohol solution of the acetalized polyvinyl alcohol resin and the fluorine resin and has a fiber diameter in a range of 30 to 800 nm.

According to another preferred embodiment of the invention on the first aspect thereof, the sheet of microfiber assembly is laminated on an air-permeable nonwoven fabric or an air-permeable woven fabric.

The second aspect of the invention targets a method for making the sheet of microfiber assembly described above.

With respect to the method for making the sheet of microfiber assembly, the second aspect of the invention comprises an electro-spinning process using spinning nozzles adapted to apply spinning solution with high voltage and a conductive collector plate placed to be opposed to the spinning nozzles at a given distance. Alcohol solution of water-insoluble but alcohol-soluble acetalized polyvinyl alcohol resin mixed with water-insoluble but alcohol-soluble fluorine resin is fed to the spinning nozzles as the spinning solution. The spinning solution is discharged from the spinning nozzles toward the collector plate and thereby the sheet of microfiber assembly which is a mixture of the acetalized polyvinyl alcohol resin and the fluorine resin is formed on a carrier sheet placed on the collector plate.

According to one preferred embodiment of the second aspect of the invention, the spinning solution contains the acetalized polyvinyl alcohol resin of 5 to 14% by weight, ethanol solution of 27-60% by weight which ethanol solution contains the fluorine resin of 5 to 15% by weight and ethanol of 20 to 62% by weight.

According to another preferred embodiment of the second aspect of the invention, the carrier sheet may be formed of an air-permeable nonwoven fabric or an air-permeable woven fabric.

The third aspect of the invention targets the apparatus for making the sheet of microfiber assembly described above.

With respect to this apparatus, the third aspect of the invention comprises a plurality of spinning nozzles continuously fed with spinning solution and serving as a plurality of positive electrodes adapted to impress the spinning solution with high voltage, a conductive collector plate placed so as to be opposed to the spinning nozzles at a desired distance and serving as a negative electrode, and traverse means carrying the spinning nozzles and adapted to be reciprocated above the collector plate in parallel to the collector plate. The traverse means is provided with a plurality of nozzle arrays each of which nozzle arrays comprises a desired number of the spinning nozzles arranged at desired pitches in a second direction being orthogonal to a first direction in which the reciprocation occurs and in parallel to the collector plate and a plurality of such nozzle arrays are provided at a desired distance in the second first direction wherein individual nozzles in one nozzle array are position-related with individual nozzles in an adjacent nozzle array to be aligned in the second direction without overlapping in a case that the adjacent nozzle array is translated in the first direction to the one nozzle array.

According to one preferred embodiment of the third aspect of the invention, each pair of the adjacent spinning nozzles are center to center spaced from each other at least by 50 mm in the traverse means.

Effect of the Invention

The sheet of microfiber assembly according to the present invention is formed of a mixture of acetalized polyvinyl alcohol resin and fluorine resin and therefore the air-permeable filter formed of this sheet can exert high water-resistance and high oil-mist resistance.

In the method according to the present invention for making the sheet of microfiber assembly, alcohol solution of alcohol-soluble acetalized polyvinyl alcohol resin and alcohol-soluble fluorine resin is used as spinning solution and therefore, in the microfibers obtained these two types of resin are adequately mixed to enhance the oil-mist resistance of the microfibers' surfaces.

The apparatus according to the present invention for making the sheet of microfiber assembly allows the number of the nozzles to be restricted even when it is desired to make the sheet of microfiber assembly having a relatively large width dimension since the nozzle arrays arranged in parallel one to another are reciprocated in the width direction of the collector plate orthogonal to these nozzle arrays. By spacing each pair of the adjacent nozzles at least by 50 mm, it is possible to restrict an electrical repulsion between the microfibers discharged from each pair of the adjacent nozzles. In this way, it is possible to facilitate the microfibers to be piled up on the carrier sheet directly below the respective nozzles and thereby to form the sheet of the uniformly distributed microfiber assembly.

Figure 1:
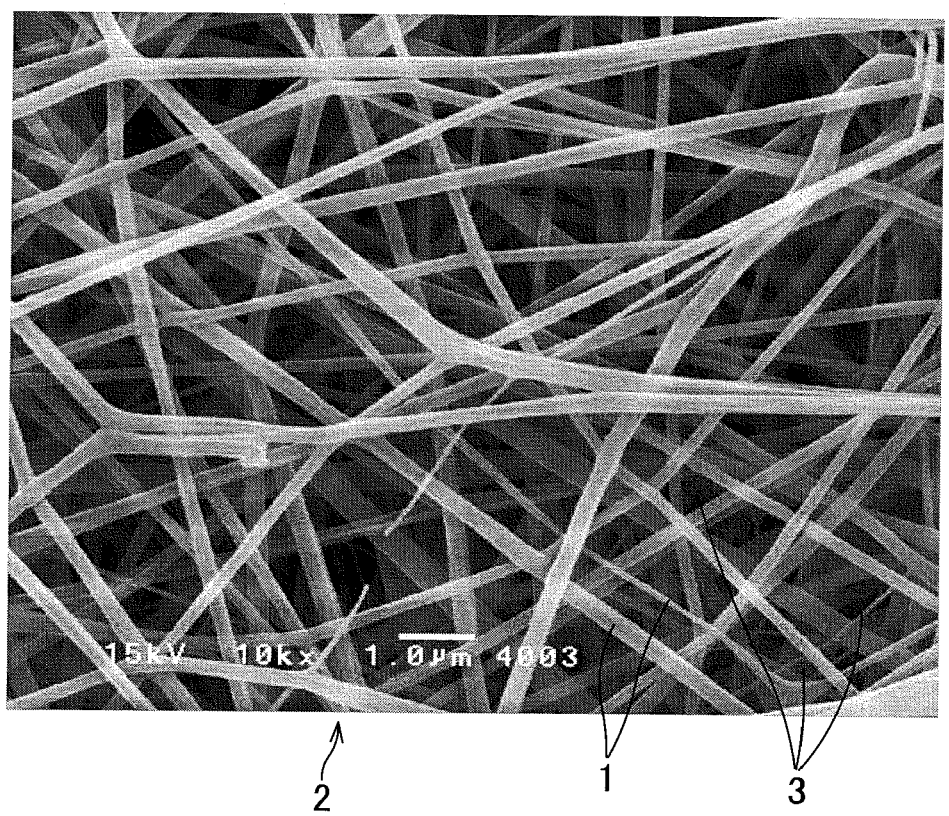
FIG. 1 shows a sheet of microfiber assembly of microfibers photographed at a magnification of 10,000 times.

IDENTIFICATION OF REFERENCE NUMERALS USED IN THE DRAWINGS 1 microfiber
2 sheet of microfiber assembly
11 nozzle
11a nozzle
11b nozzle
12 collector plate
13 traverse means
16 carrier sheet
MD second direction (machine direction)
CD first direction (cross direction)

DETAILED DESCRIPTION OF THE PREFERRED EMBODIMENTS

Details of the present invention will be described with reference to the accompanying drawings.

Figure 2:
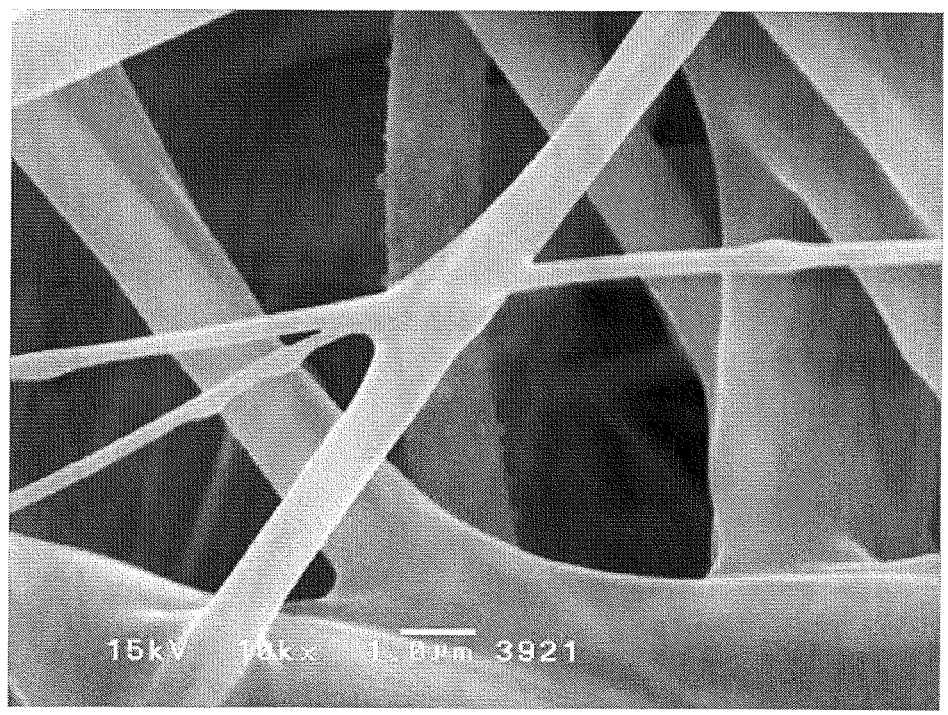
FIG. 2 shows a prior art filter photographed at a magnification of 10,000 times.

FIG. 1 is an electron microgram exemplarily showing, at a magnification of 10,000 times, a sheet of microfiber assembly 2 comprising microfibers 1 according to the present invention and FIG. 2 is an electron microgram exemplarily showing, at a magnification of 10,000 times, a ULPA filter conventionally used as a ultrahigh efficiency filter for air conditioning of a clean room to maintain the room in ultraclean condition. The term "microfiber" used herein refers to component fibers having a fiber diameter of 3,000 nm or less. The sheet of microfibers 2 exemplarily shown by FIG. 1 has a basis weight of 12 g/m² and comprising a plurality of the microfibers 1 joined together at intersections thereof to leave air-permeable interstices 3. Specifically, each of the microfibers 1 has a fiber diameter in a range of 100 to 400 nm and an average fiber diameter of about 250 nm. The microfiber 1 is a mixture of acetalized polyvinyl alcohol resin and fluorine resin and a filter using the assembly 2 has a high trapping efficiency for oil-mist such as DOP oil-mist. The filter exemplarily shown by FIG. 2 is made of a glass fiber filter paper and this glass fiber has a fiber diameter fairly larger than that of the microfiber 1 of FIG. 1 and, in this filter, the fiber interstices also are correspondingly larger as will be apparent from FIG. 2.

Figure 3:
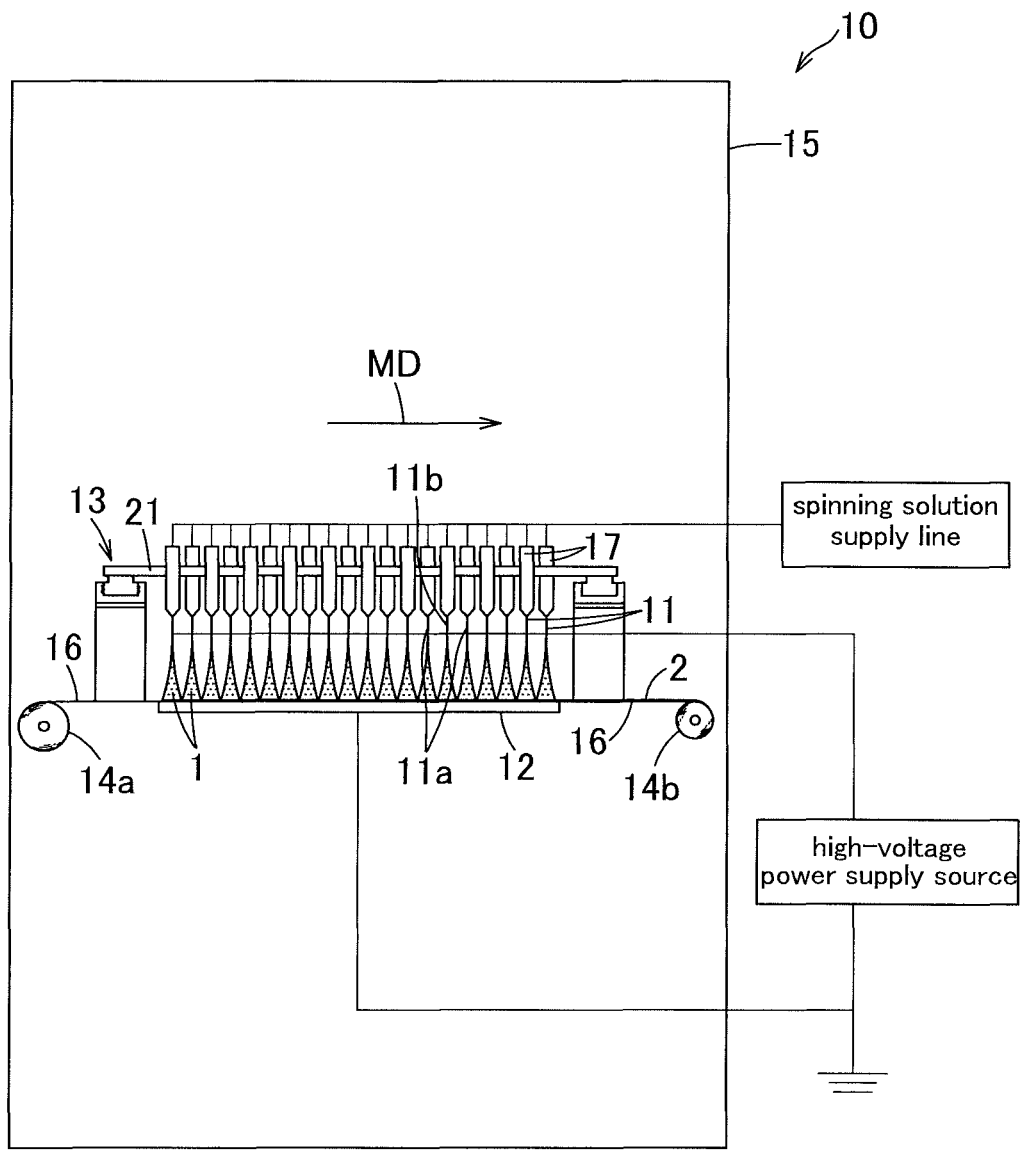
FIG. 3 shows a lateral view illustrating internal construction of an apparatus to make the sheet of microfiber assembly.
Figure 4:
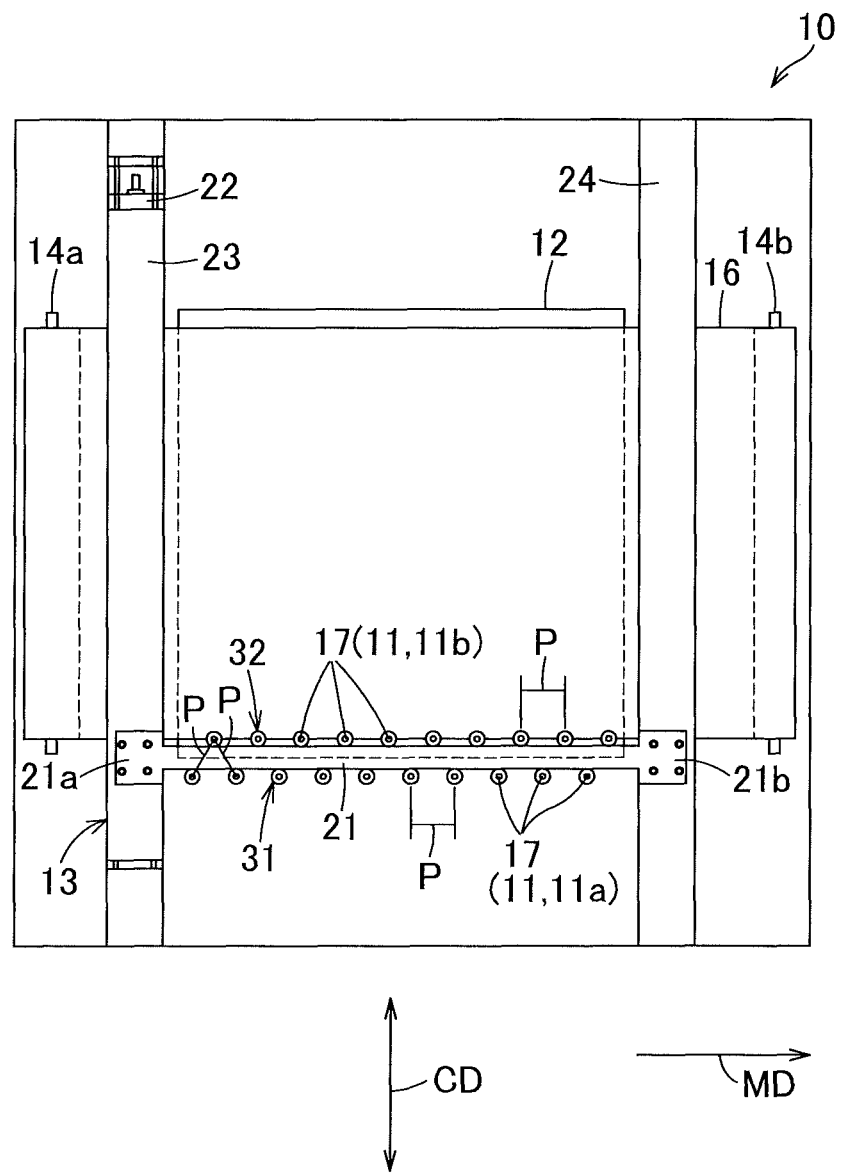
FIG. 4 shows an overhead view associated with FIG. 3.

FIGS. 3 and 4 are lateral and overhead views, respectively, exemplarily showing internal construction of an apparatus 10 to make the sheet of microfiber assembly, wherein a direction in which the sheet of microfiber assembly 2 continuously made is rolled up is indicated as a machine direction MD. The apparatus 10 is adapted to make the microfibers 1 each having a fiber diameter of 3,000 nm or less and comprises a plurality of spinning nozzles 11, a collector plate 12 located below these nozzles 11, traverse means 13 reciprocating the nozzles 11 across the collector plate 12 in a cross direction CD which is orthogonal to the machine direction MD, and a plurality of rollers 14a, 14b adapted to transport a carrier sheet 16 in the machine direction MD, wherein these components are housed within a box 15. Referring to FIG. 3, the microfibers 1 discharged downward from the respective nozzles toward the carrier sheet 16 so that a range of distribution may be broadened in the machine direction MD as well as in the cross direction CD.

Each of the nozzles 11 is formed of conductive metal such as SUS304 used in the illustrated embodiment. The inner diameter as well as the length of the nozzle 11 are set depending on the fiber diameter of the microfiber 1 to be made and, when it is desired to make the microfibers having a fiber diameter in a range of 30 to 800 nm, the nozzle 11 preferably has the inner diameter in a range of 0.2 to 0.5 mm and the length in a range of 10 to 20 mm. Tops of the respective nozzles 11 are coaxially provided with associated barrels 17 each having a diameter larger than that of the associated nozzle 11. These barrels 17 are fed with pressure-tuned spinning solution (not shown).

The collector plate 12 is formed of a smooth metallic plate having a superior electrical conductivity such as oxygen free copper or tough pitch copper. The nozzles 11 and the collector plate 12 are spaced in a vertical direction one from another by 40 to 180 mm, preferably by 80 to 150 mm and electrically connected one to another via a high-voltage power supply (indicated in FIG. 3) adapted to apply with high voltage between them. Voltage applied to the nozzles 11 may be adjusted in a range of 15 to 25 KV. The voltage lower than 15 KV will make it difficult to fiberize the spinning solution and the voltage exceeding 25 KV may cause undesirable spark discharge.

The roller 14a serves to feed a nonwoven fabric as the carrier sheet 16 and the roller 14b serves to roll up the carrier sheet 16 together with the sheet of microfiber assembly 2 laminated thereon. As will be apparent from FIG. 3, the microfibers 1 formed of the spinning solution discharged from the respective nozzles 11 gradually broaden their range of distribution in the machine direction MD and the cross direction CD as these microfibers 1 move down toward the carrier sheet 16.

In FIG. 4 illustrating the internal construction of the apparatus as viewed from above, the barrels 17 are seen but the nozzles 11 underlying the respective associated barrels 17 are not seen. However, considering the fact that these nozzles 11 are coaxial the associated barrels 17, these barrels are designated not only with reference numeral 17 but also with reference numeral 11. Referring to FIG. 4, the traverse means 13 comprises a nozzle fixing bar 21 extending in the machine direction MD defining a second direction for the traverse means 13 and an electromotor 22 serving to reciprocate opposite ends 21a, 21b of the nozzle fixing bar 21 in the cross direction CD defining a first direction for the traverse means 13 along a pair of guide means 23, 24. The respective guide means 23, 24 include belts (not shown) connected to the ends 21a, 21b, respectively, so that these belts may be driven by the single electromotor 22 to reciprocate the bar 21. Movement rate of the bar 21 in the cross direction CD may be regulated within a range of 100 to 1000 mm/sec, preferably, set to a range of 100 to 200 mm/sec. Now arrangement of the nozzles 11 will be described in more detail. A plurality of first nozzles 11a are mounted on the bar 21 to be arranged at desired, preferably regular intervals or pitches P in the machine direction MD and thereby to form a first nozzle array 31 and, in a similar manner, a plurality of second nozzles 11b are mounted on the bar 21 to be arranged at desired, preferably regular intervals or pitches P in the machine direction MD and thereby to form a second nozzle array 32 (See FIG. 3). As will be apparent from FIG. 3, each of the second nozzles 11b can be seen between each pair of the adjacent first nozzles 11a, 11a as viewed from the side. More apparently from FIG. 4, assumed that the second nozzle array 32 is translated in the cross direction CD to the line of the first nozzle array 31, each of the second nozzles 11b will be positioned at the middle between each pair of the adjacent first nozzles 11a, 11a since each pair of the adjacent first nozzles 11a is spaced from the second nozzles 11b by the same center-to-center spacing distance P. It should be appreciated that the present invention is not limited to the illustrated embodiment and the number of the nozzles 11 arranged in the machine direction MD as well as the number of the nozzle arrays arranged in the cross direction CD may be appropriately increased or decreased.

Figure 5:
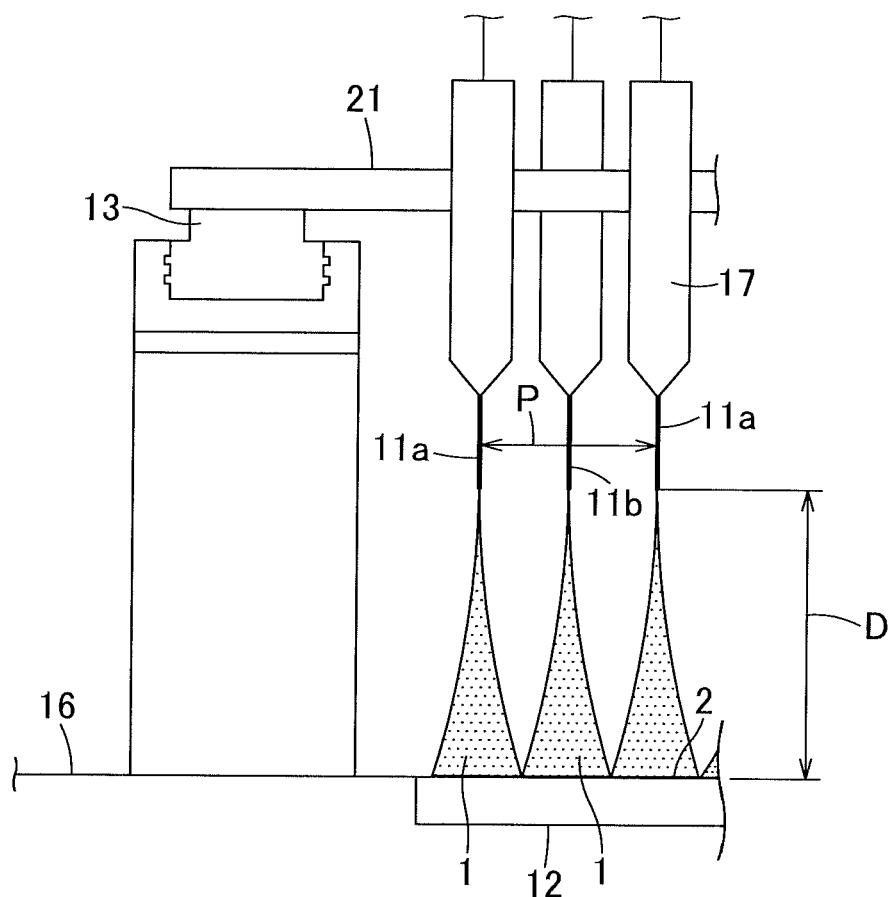
FIG. 5 shows a scale-enlarged view showing a part of FIG. 3.

FIG. 5 is a partially scale-enlarged view corresponding to FIG. 3, exemplarily illustrating how the microfibers are discharged downward from the first nozzles 11a and the second nozzles 11b onto the carrier sheet 16 overlying the collector plate 12. Under the effect of high voltage impressed between the nozzle 11 and the collector plate 12 interposing the carrier sheet 16 therebetween, the microfibers discharged vertically downward from the first nozzles 11a and the second nozzles 11b gradually broaden respective ranges of distribution to describe circles in the space defined between the nozzles 11 and the carrier sheet 16. And then, the microfibers accumulate to form the sheet of microfiber assembly 2 on the carrier sheet 16. For the apparatus 10, it is an essential requirement to prevent the microfibers 1 from being unevenly distributed on the carrier sheet 16 due to repulsion of the electrically charged microfibers 1 discharged from the respective nozzles. To meet this requirement, the pitch P between each pair of the adjacent first nozzles 11a, between each pair of the adjacent second nozzles 11b and between each pair of the adjacent first nozzle 11a and the second nozzle 11b should be appropriately dimensioned. As in the case of the illustrated embodiment, when the pitch P is dimensioned to be 80 mm and a distance D from a tip of the nozzle 11 to the collector plate 12 is dimensioned to be 115 mm, the microfibers 1 discharged obtained from the respective nozzles 11 can describe circles each having a diameter in a range of 30 to 40 mm on the areas of the carrier sheet 16 defined immediately below the respective nozzles 11. With such arrangements, the microfibers 1 coming from the respective nozzles 11 should not overlap over a wide range.

In operation of the apparatus 10, the traverse means 13 may be reciprocated a necessary number of times to pile up the microfibers 1 of a desired basis weight on the carrier sheet 16 kept at rest during reciprocations of the traverse means 13. Then, the carrier sheet 16 is moved forward in the machine direction MD by a desired distance to be taken up on the roll 14b. Such reciprocations of the traverse means 13 may be continuously repeated to form the sheet of microfiber assembly 2 in a continuous fashion. Assumed that, referring to FIG. 4, a traverse distance of the nozzles 11 is set to 270 mm, the nozzles 11 are reciprocated 44 times for about 60 sec to form the sheet of microfiber assembly 2 on the carrier sheet 16 and then the carrier sheet 16 is moved forward in the machine direction MD by a desired distance. In this way, the sheet of microfiber assembly 2 can be obtained as a nonwoven fabric having a basis weight of 12 g/m$^2$. In the spinning solution used herein, the acetalized polyvinyl alcohol resin and the fluorine resin adequately mixed together and, in the microfibers 1 obtained therefrom also, these two types of resin are adequately mixed with each other. In each of the microfibers 1, the acetalized polyvinyl alcohol resin constitutes a matrix and the fluorine resin is kneaded in this matrix, therefore the fluorine resin is prevented from falling off from the microfibers in the course of handling the sheet of microfiber assembly 2. By the way, it is also possible to immerse a nonwoven fabric for use as a filter in a solution of fluorine resin and thereby to coat the fibers of such nonwoven fabric with fluorine resin. However, the nonwoven fabric treated in this manner any amount of the fluorine resin might fall off from the nonwoven fabric in the course of handling it.

In one example of the spinning solution fed to the barrels 17, ethanol is used as alcohol. The spinning solution using the ethanol contains the water-insoluble but alcohol-soluble acetalized polyvinyl alcohol resin of 5 to 14% by weight, an ethanol solution of 27 to 60% by weight in which ethanol solution contains the water-insoluble but alcohol-soluble fluorine resin of 5 to 15% by weight, and the ethanol of 20 to 62% by weight. The term "ethanol" used herein should be understood to include ethanol having a purity of at least 95% by weight, denatured ethanol and hydrous ethanol containing water of 20 to 5% by weight. One example of the denatured ethanol is ethanol of 95% by weight mixed with isopropyl alcohol of 5% by weight and one example of the hydrous ethanol is ethanol of 83% by weight mixed with purified water of 17% by weight. The alcohol used to implement the present invention includes, in addition to the ethanol, n-butanol (n-butyl alcohol), sec-butanol (sec-butyl alcohol), 1-octanol (n-octyl alcohol), diacetone alcohol and benzyl alcohol.

The carrier sheet 16 should have air permeability higher than that of the sheet of microfiber assembly 2 to be made and, as stock material for the carrier sheet 16, various types of an air-permeable nonwoven fabric or an air-permeable woven fabric depending on the intended use. From various types of nonwoven fabrics or woven fabrics, preferably nonwoven fabrics or woven fabrics are selected, which do not prevent the spinning solution from being efficiently fiberized under the effect of the high voltage impressed to the spinning solution in the course from the nozzles 11 to the collector plate 12. Assumed that the microfibers 1 each having a fiber diameter in a range of 30 to 800 nm and the nonwoven fabric made of thermoplastic synthetic fibers is used as the carrier sheet 16, a basis weight of the nonwoven fabric is preferably in a range of 20 to 50 g/m$^2$ and fiber diameters of the thermoplastic synthetic fibers are preferably in a range of 1 to 10 μm. The basis weight less than 20 g/m$^2$ may leave pores each having a diameter of about 0.5 mm in the sheet of microfiber assembly 2 formed on the nonwoven fabric. The basis weight exceeding 50 g/m$^2$ may result in ununiform deposition of the microfibers 1. As the nonwoven fabric defining the carrier sheet 16, both a nonwoven fabric obtained by dry-spinning and a nonwoven fabric obtained by wet-spinning may be used. Exemplarily, a spun-bonded nonwoven fabric, a thermal-bonded nonwoven fabric, a chemical-bonded nonwoven fabric and a spun lace nonwoven fabric may be effectively used. In addition, there are some other types of nonwoven fabrics useful also to implement the invention. Whether the carrier sheet 16 is formed by a nonwoven fabric or woven fabric, the surface of this carrier sheet 16 on which the sheet of microfiber assembly 2 is to be formed is preferably as smooth as possible. "Warifu" (trade name) manufactured by Nisseki PLAST Co., Ltd is one example of the nonwoven fabric which can be used to implement the invention. A nonwoven fabric like this "Warifu" characterized by a flat radial cross-sectional shape of the individual fibers as well as of the fiber bundle consisting of plural fibers aligned in one direction is particularly preferable as the material for the carrier sheet 16.

TABLE 1 indicates compositions of examples of spinning solutions used by the apparatus shown by FIGS. 3 and 4 and fiber diameters of the microfiber 1 in the sheets of microfiber assembly 2 obtained from the spinning solutions. Referring to TABLE 1, three types of acetalized polyvinyl alcohol resins having glass transition temperatures (Tg) varied by adjusting their molecular weights and residual quantities (mol %) of hydroxyl group, i.e., PVA-1, PVA-2 and PVA-3 were used. Tg of PVA-1 was 66° C., Tg of PVA-2 was 106° C. and Tg of PVA-3 was 107° C. Referring to TABLE 1, a mixture of fluorine rein of 10% by weight, water of 45% by weight, ethanol of 45% by weight whose purity is 95% by weight and isopropyl alcohol of 5% by weight was used as fluorine resin solution. Referring to TABLE 1, denatured ethanol containing ethanol of 95% by weight whose purity is 95% by weight and isopropyl alcohol of 5% by weight were used as ethanol solvent. As the carrier sheet 16, a nonwoven fabric of polypropylene resin fibers each having a fiber diameter in a range of 1 to 2 μm was used. Average fiber diameter indicated in TABLE 1 was obtained by procedures as follows: from a visual view of scanning electron micrograph of the sheet of microfiber assembly 2 at a magnification of 10,000 times, twenty (20) microfibers 1 were arbitrarily selected, an intermediate value between the maximum diameter and the minimum diameter was obtained for each of these twenty (20) microfibers 1 and an average value of these intermediate values for these twenty (20) microfibers 1. Such average values are indicated in TABLE 1.

TABLE 1

| Spinning solution No. | Composition | Compounding ratio (% by weight) | Average fiber diameter (nm) | Distribution range of fiber diameter (nm) |
|---|---|---|---|---|
| 1 | PVA-1 | 10 | 290 | 70-500 |
|   | Ethanol solvent | 61 |   |   |
|   | Fluorine resin solution | 29 |   |   |
| 2 | PVA-2 | 8 | 250 | 100-400 |
|   | Ethanol solvent | 28 |   |   |
|   | Fluorine resin solution | 64 |   |   |
| 3 | PVA-3 | 7 | 250 | 100-400 |
|   | Ethanol solvent | 39 |   |   |
|   | Fluorine resin solution | 54 |   |   |

TABLE 2 indicates a result of comparing the filter performance between the sheet of microfiber assembly 2 of the present invention obtained by using spinning solution No. 2 containing fluorine resin solution and the comparative sheet obtained from a mixture of PVA-2 of 10% by weight and ethanol solvent of 90% by weight and containing no fluorine resin solution (indicated in TABLE 2 as "without" fluorine resin solution). It should be appreciated that the same ethanol solvent as the ethanol solvent indicated in TABLE 1 has been used for the comparative sheet. Test conditions for determination of the filter performance were as follows:
  (1) Test particle: mist of DOP (Di-octyl phthalate) (0.185±0.02 μm, σg: 1.6 or less, in accordance with NIOSH Standard)
  (2) Test flow rate: 30 l/min (aeration rate: 5 cm/sec)
  (3) Deposition test: up to 50 mg
  (4) Tester: CERTITEST Model 8130 manufactured by TSI Corporation (USA)

TABLE 2

| Acetalized poly-vinyl alcohol resin | Fluorine resin | Initial pressure loss (Pa) | Initial passing rate loss (%) | Passing rate with DOP 20 mg deposited (%) |
|---|---|---|---|---|
| PVA-2 | With | 317 | 0.001 | 0.001 |
|   | Without | 267 | 0.001 | 0.114 |

The invention claimed is:
1. An air-permeable sheet of microfiber assembly comprising:
   microfibers, said microfibers being a mixture of water-insoluble but ethanol-soluble acetalized polyvinyl alcohol resin and water-insoluble but ethanol-soluble fluorine resin,
   wherein
   the microfibers comprise a matrix of the polyvinyl alcohol resin and the fluorine resin is blended into the matrix,
   said air-permeable sheet of microfiber assembly is an air-permeable filter having a filtering property for oil mist,
   each microfiber is obtained by electro-spinning an alcohol solution of said acetalized polyvinyl alcohol resin and said fluorine resin, wherein each microfiber has a fiber diameter in a range of 30 nm to 800 nm,
   said air-permeable sheet of microfiber assembly is laminated on an air-permeable nonwoven fabric having air permeability higher than that of said air-permeable sheet of microfiber assembly,
   said air-permeable nonwoven fabric contains thermoplastic synthetic fibers and has a basis weight of 20 to 50 g/m$^2$, and
   individual fibers or a fiber bundle of the thermoplastic synthetic fibers has a flat radial cross-sectional shape to define a smooth surface of the air-permeable nonwoven fabric, the individual fibers being aligned in one direction.
2. The sheet of microfiber assembly defined by claim 1, wherein said microfibers contain equal to or less than 44.4% wt % of said fluorine resin.
3. The sheet of microfiber assembly defined by claim 1, wherein said microfibers contain 22.5% wt % to 44.4% wt % of said fluorine resin.
4. The sheet of microfiber assembly defined by claim 1, wherein said thermoplastic synthetic fibers in the fiber bundle have fiber diameters of 1 to 10 μm.

* * * * *